US012637553B2

(12) United States Patent
Nakano et al.

(10) Patent No.: US 12,637,553 B2
(45) Date of Patent: May 26, 2026

(54) ELECTRICALLY CONDUCTIVE COMPOSITION, SHEET-FORM FLEXIBLE ELECTRODE USING SAME, AND METHOD FOR PRODUCING SAID ELECTRODE

(71) Applicant: Sumitomo Riko Company Limited, Aichi (JP)

(72) Inventors: Masayoshi Nakano, Aichi (JP); Tsubasa Shinozuka, Aichi (JP); Naoki Watanabe, Aichi (JP); Shoji Arimura, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 18/297,638

(22) Filed: Apr. 9, 2023

(65) Prior Publication Data

US 2023/0242742 A1 Aug. 3, 2023

Related U.S. Application Data

(63) Continuation of application No. PCT/JP2021/048166, filed on Dec. 24, 2021.

(30) Foreign Application Priority Data

Dec. 25, 2020 (JP) ................................. 2020-216870

(51) Int. Cl.
*C08L 9/06* (2006.01)
*C08K 3/04* (2006.01)
(Continued)

(52) U.S. Cl.
CPC .................. *C08L 9/06* (2013.01); *C08K 3/04* (2013.01); *C08K 3/34* (2013.01); *C08K 5/09* (2013.01);
(Continued)

(58) Field of Classification Search
CPC .................................................. C08L 2207/04
See application file for complete search history.

(56) References Cited

U.S. PATENT DOCUMENTS 6,294,257 B1 * 9/2001 Tsukakoshi ................ C08J 5/18
428/407
9,896,565 B2 2/2018 Nosker et al.
(Continued)

FOREIGN PATENT DOCUMENTS

CN 108885919 11/2018
EP 3998646 5/2022
(Continued)

OTHER PUBLICATIONS

Torsten Sjögren, "Influences of the Graphite Phase on Elastic and Plastic Deformation Behaviour of Cast Irons", 2007, Linköping Studies in Science and Technology, Department of Management and Engineering, pp. 1-51.*

(Continued)

*Primary Examiner* — Khanh T Nguyen
(74) *Attorney, Agent, or Firm* — JCIPRNET

(57) ABSTRACT

This electrically conductive composition includes a thermoplastic elastomer and flaky graphite, the melt viscosity of the thermoplastic elastomer at 200° C. in a low-shear zone with a shear rate of 60 s$^{-1}$ to 200 s$^{-1}$ being 50 Pa·s to 1400 Pa·s, and the roundness of the flaky graphite being 0.5 or less. This method for producing a sheet-form flexible electrode has a kneading step for kneading expanded graphite and a thermoplastic elastomer having a melt viscosity of 50 Pa·s to 1400 Pa·s at 200° C. in a low-shear zone with a shear rate of 60 s$^{-1}$ to 200 s$^{-1}$ to produce the electrically conductive composition, and a molding step for molding the electrically conductive composition into the form of a sheet by injection molding or extrusion molding.

10 Claims, 2 Drawing Sheets

(51) Int. Cl.

| | |
|---|---|
| *C08K 3/34* | (2006.01) |
| *C08K 5/09* | (2006.01) |
| *G01N 27/22* | (2006.01) |
| *G01N 27/30* | (2006.01) |
| *H01M 4/1399* | (2010.01) |
| *H01M 4/60* | (2006.01) |

(52) U.S. Cl.

CPC ........... *G01N 27/227* (2013.01); *G01N 27/30* (2013.01); *H01M 4/1399* (2013.01); *H01M 4/604* (2013.01); *C08K 3/042* (2017.05); *C08K 2201/001* (2013.01); *C08L 2207/04* (2013.01)

(56) References Cited

U.S. PATENT DOCUMENTS

| | | | | |
|---|---|---|---|---|
| 10,978,216 | B2 | 4/2021 | Taguchi et al. | |
| 11,098,175 | B2 | 8/2021 | Nosker et al. | |
| 2003/0168638 | A1* | 9/2003 | Butler ..................... | C08L 67/06 |
| | | | | 252/500 |
| 2013/0037760 | A1* | 2/2013 | Maeda ................ | H01M 8/0213 |
| | | | | 252/511 |

| | | | |
|---|---|---|---|
| 2017/0098488 | A1 | 4/2017 | Sugita et al. |
| 2018/0233250 | A1 | 8/2018 | Taguchi et al. |
| 2021/0206418 | A1 | 7/2021 | Nakano et al. |
| 2021/0332068 | A1 | 10/2021 | Wu |

FOREIGN PATENT DOCUMENTS

| | | |
|---|---|---|
| JP | 5812313 | 11/2015 |
| JP | 2015537075 | 12/2015 |
| JP | 2021535111 | 12/2021 |
| WO | 2017169627 | 10/2017 |
| WO | 2020066121 | 4/2020 |

OTHER PUBLICATIONS

"International Search Report (Form PCT/ISA/210) of PCT/JP2021/048166", mailed on Mar. 15, 2022, with English translation thereof, pp. 1-4.

"Search Report of Europe Counterpart Application", issued on May 7, 2024, p. 1-p. 6.

"Office Action of China Counterpart Application", issued on May 20, 2024, with English translation thereof, p. 1-p. 16.

\* cited by examiner

ELECTRICALLY CONDUCTIVE COMPOSITION, SHEET-FORM FLEXIBLE ELECTRODE USING SAME, AND METHOD FOR PRODUCING SAID ELECTRODE

CROSS-REFERENCE TO RELATED APPLICATION

This application is a continuation of PCT International Application No. PCT/JP2021/048166, filed on Dec. 24, 2021, which claims priority under 35 U.S.C § 119(a) to Japanese Patent Application No. 2020-216870, filed on Dec. 25, 2020. Each of the above application(s) is hereby expressly incorporated by reference, in its entirety, into the present application.

TECHNICAL FIELD

The present disclosure relates to an electrically conductive composition suitable for a flexible electrode material of a capacitance sensor or the like, as well as to a sheet-form flexible electrode using the electrically conductive composition and a method for producing the sheet-form flexible electrode.

RELATED ART

With the rapid development of the Internet of things (IoT), in the fields of nursing care, health management, and training, there is an increasing demand for a biological information sensor that measures respiratory conditions, heart rate or the like. Also, a vehicle such as an automobile is equipped with various sensors such as a steering sensor and a seating sensor in order to detect a state of an occupant. For these sensors, from the viewpoint of enhancing followability to a movement of a subject and reducing discomfort, a flexible material such as an elastomer may be used. For example, Patent Document 1 describes, as a material capable of forming a flexible electrode, an electrically conductive film including an elastomer and a flake-like carbon material. According to Patent Document 1, a dispersion in which graphite is dispersed in a solvent is subjected to a grinding treatment using a wet jet mill, whereby the graphite is exfoliated between layers and formed into flakes. Patent Document 2 describes a reticulated flexible electrode including a thermoplastic elastomer and a carbon material. The reticulated flexible electrode described in Patent Document 2 is produced by adding the carbon material to the thermoplastic elastomer, kneading the mixture, and extruding the resulting electrically conductive composition.

PRIOR-ART DOCUMENTS

Patent Documents

Patent Document 1: WO 2017/169627
Patent Document 2: WO 2020/066121
Patent Document 3: Japanese Patent No. 5812313
Patent Document 4: Japanese Translation of PCT International Application Publication No. 2015-537075

As described in Patent Document 1, when the dispersion in which the graphite is dispersed in the solvent is subjected to the grinding treatment using the wet jet mill, a shear force is applied to the graphite, and the solvent enters between layers of the graphite, thus promoting cleavage. Accordingly, the graphite is exfoliated between the layers, and flaky graphite whose number of layers of graphene is smaller than that before the grinding treatment is produced. In Patent Document 1, by blending the flaky graphite produced in this way with the elastomer, a flexible electrically conductive film having very high conductivity at a level of $10^{-2}$ $\Omega \cdot cm$ is realized.

However, a wet method used to produce flaky graphite, in which graphite is dispersed in a solvent and a wet jet mill or the like is used, requires advanced techniques and increases costs. Thus, the wet method is not suitable for mass production of an electrically conductive composition. In addition, as it is required to reduce the emission of volatile organic compounds (VOCs) as an environmental measure, a reduction in the amount of solvent used is necessary. Hence, it is desired to produce a flexible electrically conductive composition by a method not using a solvent and suitable for mass production.

For example, according to Patent Document 2, an electrically conductive composition is produced by adding the carbon material such as carbon black to the thermoplastic elastomer and kneading the mixture. However, as shown in Table 1 of Patent Document 2, as indicated by a volume resistivity of 1.3 to 9.0 $\Omega \cdot cm$ of a molded body of the electrically conductive composition, it is difficult to achieve high conductivity only by adding the carbon material to the thermoplastic elastomer and kneading the mixture. As a result of earnest studies conducted by the present inventor on a difference from the wet method, the following two finding have been obtained as reasons for deterioration in conductivity. Firstly, when kneading is performed, micronization by breaking rather than flaking of the carbon material is more likely to occur, and therefore, the carbon material is likely to be spheroidized. When the shape of the carbon material approaches spherical, mutual contact area is reduced. Secondly, even if graphite is used as the carbon material, unlike a solvent, a common thermoplastic elastomer has high viscosity and therefore hardly enters between layers of graphite. Hence, cleavage of graphite is not promoted and flaking is hard to proceed.

SUMMARY OF THE INVENTION

The present disclosure provides an electrically conductive composition that is flexible, has high conductivity, is relatively easy to produce, and can be mass-produced. The present disclosure further provides a sheet-form flexible electrode using the electrically conductive composition, and a method for producing the sheet-form flexible electrode with excellent productivity.

(1) An electrically conductive composition of the present disclosure is an electrically conductive composition containing a thermoplastic elastomer and flaky graphite, characterized in that a melt viscosity of the thermoplastic elastomer at 200° C. in a low shear zone with a shear rate of 60 s$^{-1}$ or more and 200 s$^{-1}$ or less is 50 Pa·s or more and 1400 Pa·s or less, and the flaky graphite has a roundness of 0.5 or less.

(2) A sheet-form flexible electrode of the present disclosure is characterized by using the electrically conductive composition of the present disclosure according to (1).

(3) A capacitance sensor of the present disclosure is characterized by including the sheet-form flexible electrode of the present disclosure according to (2).

(4) A method for producing a sheet-form flexible electrode of the present disclosure is a method for producing the sheet-form flexible electrode of the present disclosure according to (2), characterized by including: a kneading step in which a raw material composition containing a thermoplastic elastomer and expanded graphite is kneaded to produce an electrically conductive composition, the thermoplastic elastomer having a melt viscosity of 50 Pa·s or more and 1400 Pa·s or less at 200° C. in a low shear zone with a shear rate of 60 s$^{-1}$ or more and 200 s$^{-1}$ or less; and a molding step in which the electrically conductive composition is injection molded or extrusion molded into a form of a sheet.

DESCRIPTION OF THE EMBODIMENTS

Embodiments of an electrically conductive composition, a sheet-form flexible electrode using the electrically conductive composition, and a method for producing the sheet-form flexible electrode of the present disclosure will be described below in detail. The electrically conductive composition, the sheet-form flexible electrode using the electrically conductive composition, and the method for producing the sheet-form flexible electrode of the present disclosure are not limited to the following forms, and various modifications and improvements that may be made by those skilled in the art can be implemented without departing from the gist of the present disclosure.

(1) The electrically conductive composition of the present disclosure contains, as a conductive material, flaky graphite having a roundness of 0.5 or less. Roundness is an indicator of degree of spheroidization of a particle shape. The roundness is calculated by the following Equation (i), and approaches 1 as the particle shape approaches spherical.

$$\text{Roundness} = (\text{circle equivalent diameter})^2/(\text{maximum Feret diameter})^2 \qquad (i)$$

[In Equation (i), the circle equivalent diameter (Da) is a diameter of a circle having the same area (S) as a projected image of the particle (Da=$\sqrt{(4S/\pi)}$), and the maximum Feret diameter is a diameter at which a distance between two parallel lines sandwiching a particle image is maximum.]

In the present disclosure, the roundness is an indicator of shape irregularity (particularly degree of angularity) of flaky graphite. It may be considered that, the smaller the roundness, the greater the angularity. Flaky graphite having a roundness of 0.5 or less does not undergo micronization in a production process and is relatively angular. Thus, when the flaky graphite is contained, graphite flakes are in line contact with each other in the electrically conductive composition, and the contact area is increased. Accordingly, formation of a conduction path is facilitated and high conductivity can be realized.

Since the electrically conductive composition of the present disclosure contains a thermoplastic elastomer as a base material, the electrically conductive composition is flexible.

Figure 1:
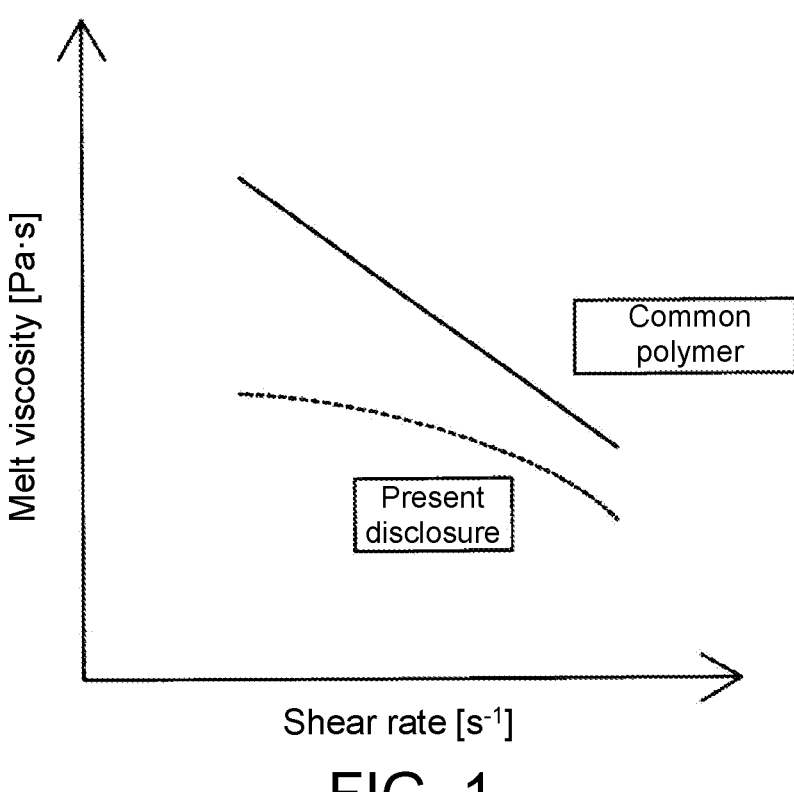
FIG. 1 is an explanatory diagram showing a relationship between melt viscosity of a polymer and shear rate.

The melt viscosity of the thermoplastic elastomer at 200° C. in the low shear zone with a shear rate of 60 s$^{-1}$ or more and 200 s$^{-1}$ or less is 50 Pa·s or more and 1400 Pa·s or less. This condition means that the melt viscosity is low in the low shear zone. Here, a relationship between melt viscosity of a polymer and shear rate is described. FIG. 1 schematically shows a relationship between melt viscosity of a polymer and shear rate. As shown by a solid line in FIG. 1, the melt viscosity of a polymer generally increases as the shear rate decreases. In contrast, in the thermoplastic elastomer used in the electrically conductive composition of the present disclosure, as shown by a dotted line in FIG. 1, even if the shear rate decreases, the melt viscosity is low and hardly changes. That is, the thermoplastic elastomer has high fluidity in the low shear zone.

The low shear zone at 200° C. corresponds to conditions during kneading and molding during production of the electrically conductive composition. Thus, the thermoplastic elastomer used in the electrically conductive composition of the present disclosure has low viscosity during kneading during production of the electrically conductive composition. Hence, in the case where graphite is used as a raw material, the thermoplastic elastomer is likely to enter between layers of graphite and promote cleavage, without relying on the wet method using a solvent. Accordingly, the desired flaky graphite may be produced. The viscosity of the thermoplastic elastomer is low even in conditions for extrusion molding or injection molding. Accordingly, moldability is improved, and a molded product of good quality can be continuously produced. On the other hand, the thermoplastic elastomer has moderate viscosity so that a shear force that promotes cleavage of graphite as a raw material can be applied thereto.

According to the above, the electrically conductive composition of the present disclosure is excellent in flexibility and conductivity. Since the electrically conductive composition is also excellent in moldability, high mass productivity is achieved. A melt flow rate (MFR) is provided as an indicator of fluidity of a polymer. However, this indicator is unable to express a difference in ease of flow with respect to shear rate. Accordingly, in the present disclosure, fluidity is defined by melt viscosity.

Patent Document 3 describes a graphene composite in which a graphite-based carbon material having a predetermined 3R value of 31% or more obtained by an X-ray diffraction method is used, and graphene obtained by exfoliating at least a portion of the graphite-based carbon material is dispersed in a base material. Patent Document 3 does not discuss flexibility and conductivity of the graphene composite. In the graphene composite described in Patent Document 3, the graphite-based carbon material as a raw material is limited. Patent Document 3 only mentions a common thermoplastic elastomer as an example of the base material (paragraph) [0073]), and has no description of the shape of the dispersed graphene. The graphene has a very small particle size, as described in a particle size distribution having a peak at 0.5 μm in FIG. 11. Patent Document 4 describes a method for producing a graphene-reinforced polymer matrix composite. In Patent Document 4, by dispersing graphite microparticles in a molten thermoplastic polymer and applying a shear force, graphite is exfoliated. Patent Document 4 does not discuss flexibility and conductivity of the graphene-reinforced polymer matrix. Patent Document 4 only mentions a thermoplastic elastomer as one of base materials (paragraph [0036]) and describes that a thickness of graphene in a c-axis direction is less than 10 nm, and has no description of the shape.

(2) A sheet-form flexible electrode of the present disclosure uses the above-mentioned electrically conductive composition of the present disclosure. Hence, the sheet-form flexible electrode of the present disclosure is flexible and has high conductivity. Since an electrode of good quality can be continuously produced by extrusion molding or injection molding or the like, excellent mass productivity is achieved.

(3) A capacitance sensor of the present disclosure includes the above-mentioned sheet-form flexible electrode of the present disclosure. Hence, the entire sensor can be easily made flexible and can be easily mounted on a curved surface. Since the electrode has high conductivity, detection accuracy is improved. For example, if a member adjacent to the electrode is made of a thermoplastic elastomer, by utilizing adhesiveness between the sheet-form flexible electrode and the adjacent member, the sheet-form flexible electrode and the adjacent member can be fixed without using an adhesive or the like. If the adjacent member is softened by heating, the sheet-form flexible electrode and the adjacent member can be fixed by heating the adjacent member and fusing it together with the sheet-form flexible electrode. In particular, if a polymer of the adjacent member is of the same kind as the thermoplastic elastomer of the sheet-form flexible electrode, compatibility between the polymer and the thermoplastic elastomer enables relatively strong integration. In this way, when the use of an adhesive that has conventionally been necessary for fixing adjacent layers can be eliminated, the number of production steps can be reduced, and costs can be reduced. Accordingly, the capacitance sensor of the present disclosure can be configured at a relatively low cost.

(4) According to the method for producing a sheet-form flexible electrode of the present disclosure, first, in the kneading step, the electrically conductive composition is produced containing the thermoplastic elastomer having a predetermined melt viscosity and the expanded graphite. By kneading, a shear force is applied to the expanded graphite, and the thermoplastic elastomer is likely to enter between layers of the expanded graphite. Therefore, cleavage may be promoted. Accordingly, the desired flaky graphite may be produced without using a solvent. The viscosity of the thermoplastic elastomer is low even in conditions for extrusion molding or injection molding. Hence, in the subsequent molding step, the electrically conductive composition can be easily molded into the form of a sheet by extrusion molding or injection molding. In this way, according to the production method of the present disclosure, a sheet-form flexible electrode that has high conductivity and is thin can be easily produced. By adopting extrusion molding or injection molding, continuous production becomes possible and productivity can be improved.

<Electrically Conductive Composition>

An electrically conductive composition of the present disclosure contains a thermoplastic elastomer and flaky graphite. The electrically conductive composition of the present disclosure may or may not undergo molding if it contains a thermoplastic elastomer and flaky graphite.

[Thermoplastic Elastomer]

The thermoplastic elastomer is a base polymer that constitutes the electrically conductive composition of the present disclosure. Examples thereof include an olefin-based thermoplastic elastomer, a styrene-based thermoplastic elastomer, a urethane-based thermoplastic elastomer, an acrylic-based thermoplastic elastomer, an ester-based thermoplastic elastomer, and a polyamide-based thermoplastic elastomer. Among them, the olefin-based thermoplastic elastomer and the styrene-based thermoplastic elastomer are preferable because of good moldability and flexibility. The olefin-based thermoplastic elastomer has a polyolefin such as polypropylene or polyethylene as a hard segment and has a rubber component such as ethylene-propylene rubber (EPM, EPDM) as a soft segment. The styrene-based thermoplastic elastomer has polystyrene as a hard segment and has a polyolefin as a soft segment. The styrene-based thermoplastic elastomer has high affinity for flaky graphite due to the 7C-7C interaction between aromatic rings. Thus, it is conceivable that the styrene-based thermoplastic elastomer has a great effect of increasing conductivity of the electrically conductive composition. The greater the styrene content, the higher the conductivity. However, when the styrene content is increased, hardness is increased and moldability is reduced. Hence, considering conductivity, moldability and the like, the styrene content is desirably 35% by mass or less. Examples of the styrene-based thermoplastic elastomer include a styrene-butadiene-styrene block copolymer (SBS), a styrene-ethylene-butylene-styrene block copolymer (SEBS), a styrene-ethylene-propylene-styrene block copolymer (SEPS), and a styrene-ethylene-ethylene-propylene-styrene block copolymer (SEEPS).

As the thermoplastic elastomer, one satisfying the above condition regarding melt viscosity, namely, "having a melt viscosity of 50 Pa·s or more and 1400 Pa·s or less at 200° C. in a low shear zone with a shear rate of 60 $s^{-1}$ or more and 200 $s^{-1}$ or less" (hereinafter sometimes referred to as condition (a)), is adopted. From the viewpoint of further reducing viscosity, enhancing the effect of promoting cleavage by entry between layers and improving moldability, the melt viscosity of the thermoplastic elastomer at 200° C. in the low shear zone is desirably 800 Pa·s or less, 700 Pa·s or less, or even 500 Pa·s or less. In contrast, from the viewpoint of applying a moderate shear force to graphite as a raw material, the melt viscosity is desirably 100 Pa·s or more, or even 150 Pa·s or more.

Considering moldability and robustness, it is desirable that the melt viscosity of the thermoplastic elastomer hardly change (be stable) in the low shear zone. In this case, it is desirable that the thermoplastic elastomer satisfy, in addition to the above condition (a), a condition that "the melt viscosity at 200° C. in the low shear zone with a shear rate of 60 $s^{-1}$ or more and 200 $s^{-1}$ or less is 4 times or less the melt viscosity at the same temperature in a high shear zone with a shear rate of 1000 $s^{-1}$ or more and 1220 $s^{-1}$ or less" (hereinafter sometimes referred to as condition (b)). The condition (b) means that, even if the shear rate decreases, the melt viscosity is low and hardly changes. A melt viscosity ratio (melt viscosity in low shear zone/melt viscosity in high shear zone) is preferably 3.5 times or less, more preferably 3.2 times or less. When the condition (b) is satisfied, unevenness in viscosity of the electrically conductive composition depending on conditions such as molding speed is reduced, and moldability is improved. Since there is little dependence on conditions during kneading, robustness is improved. Further, from the viewpoint of making the electrically conductive composition of the present disclosure flexible, type A durometer hardness of the thermoplastic elastomer is desirably 60 or less.

One kind of thermoplastic elastomer may be used alone, or two or more kinds may be used in combination. If two or more kinds of thermoplastic elastomers are used in combination, it suffices if a mixed elastomer obtained by mixing these thermoplastic elastomers satisfies the conditions (a) and (b) regarding melt viscosity. In the electrically conductive composition of the present disclosure, the main polymer component is a thermoplastic elastomer. However, the present disclosure does not exclude forms in which polymers other than thermoplastic elastomers are contained. In the case where other polymers are blended in, it is desirable that the condition (a) and further the condition (b) regarding melt viscosity be satisfied, as in the case of thermoplastic elastomers.

[Flaky Graphite]

Figure 2:
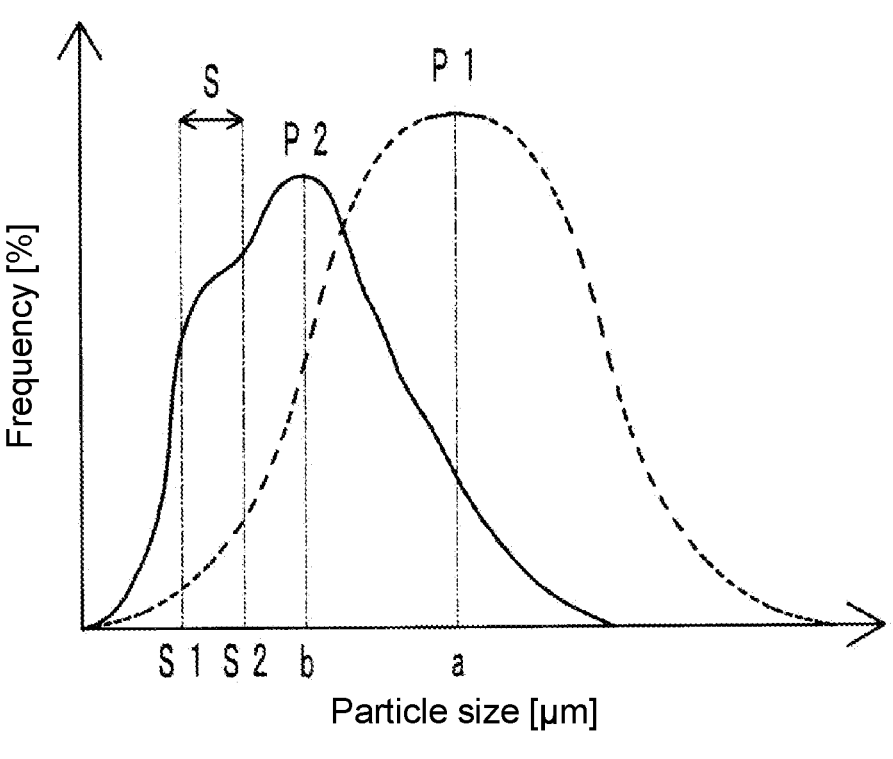
FIG. 2 is a schematic diagram of a particle size distribution before and after kneading in the case of using expanded graphite as a raw material of an electrically conductive composition.

The flaky graphite has a roundness of 0.5 or less. When the roundness is small, the shape becomes irregular, angularity is increased, and graphite flakes are in line contact with each other and the contact area is increased. Therefore, the effect of increasing conductivity is great. As a result of earnest studies conducted by the present inventor on flaking of graphite, the following finding has been obtained. In a production process of an electrically conductive composition, when graphite as a raw material is broken and undergoes micronization rather than flaking, in a comparison of particle size of the graphite before and after production, the graphite after production has a smaller particle size. This is shown by the following fact. In a comparison of frequency distribution of particle size of the graphite before and after production, a peak top of a particle size distribution curve of the graphite after production may shift closer to a small particle size side than a peak top of a particle size distribution curve of the graphite (as a raw material) before production, and a broad particle size distribution is achieved. In contrast, in the production process of the electrically conductive composition, when the graphite as a raw material is cleaved and undergoes flaking instead of micronization, in the comparison of particle size of the graphite before and after production, a trend appears different from that the graphite after production simply tends to have a smaller particle size. The particle size distribution is shown and described below. FIG. 2 is a schematic diagram of a particle size distribution before and after kneading in the case of using expanded graphite as a raw material of an electrically conductive composition. In FIG. 2, a dotted line indicates a particle size distribution of the expanded graphite as a raw material, and a solid line indicates a particle size distribution of flaky graphite in the electrically conductive composition produced through kneading.

As shown by the dotted line in FIG. 2, the particle size distribution curve of the expanded graphite as a raw material has one peak, and a peak top P1 is present at a particle size a. On the other hand, if the expanded graphite undergoes flaking by kneading, as shown by the solid line in FIG. 2, as a peak top P2 moves to a particle size b smaller than the particle size a, a shoulder portion S appears on the small particle size side of the peak top P2. A shoulder portion in a particle size distribution curve refers to a section where the curve changes in inclination and bulges upward against the slope of the curve. Since the shoulder portion occurs in the case where particles of similar sizes are mixed at the same frequency, it is conceivable that the shoulder portion may appear when graphite does not simply undergo micronization. In other words, if the shoulder portion continuously appears on the small particle size side of an arbitrary peak, it may be determined that flaking of graphite has progressed. Based on the above finding, it is desirable that, in the electrically conductive composition of the present disclosure, a volume-based particle size distribution curve of flaky graphite have one or more peaks, and a shoulder portion continuous on the small particle size side of a main peak defined by selecting one of the peaks as the main peak. From the viewpoint of making the size of flaky graphite relatively large, facilitating formation of a conduction path and realizing high conductivity, it is desirable that, in a particle size distribution curve, a peak top of the main peak be present at a particle size of 50 μm or more to 300 μm, and at least one of a start point and an end point of the shoulder portion be present at a particle size of 10 μm or more to 100 μm. Here, the start point of the shoulder portion is a particle size on the small particle side at which the shoulder portion is marked off, and the end point is a particle size on a large particle size side. In the shoulder portion S shown in FIG. 2, the start point is S1 and the end point is S2.

The electrically conductive composition of the present disclosure may contain, in addition to flaky graphite, other materials that impart conductivity, if the desired flexibility and conductivity can be realized. Examples of the other materials include a carbon material such as graphite, expanded graphite, a carbon nanotube, and carbon fiber, and a metal material such as silver, gold, copper, platinum, and nickel. For example, when an electrically conductive filler having a particle size of 1 μm or less is contained, a reinforcing effect may be achieved, and elongation or strength may be effectively improved. Examples of the electrically conductive filler having a particle size of 1 μm or less include carbon black, a carbon nanotube, and graphene. Among them, carbon black has a high reinforcing effect because a structure is formed. The term "particle size" in this case means a maximum diameter of the electrically conductive filler. However, in the case where the electrically conductive filler is a material (such as carbon black) in which primary particles aggregate to form a structure, the term "particle size" means a particle size of the primary particles. From the viewpoint of maintaining flexibility, the content of the electrically conductive filler is desirably 5 parts by mass or more and 20 parts by mass or less with respect to 100 parts by mass of the thermoplastic elastomer.

From the viewpoint of achieving both flexibility and conductivity, in the electrically conductive composition of the present disclosure, the content of flaky graphite is desirably 10 parts by mass or more and 100 parts by mass or less with respect to 100 parts by mass of the thermoplastic elastomer. Considering conductivity, the content is more preferably 30 parts by mass or more and 50 parts by mass or more. Considering flexibility and moldability, the content is more preferably 90 parts by mass or less and 80 parts by mass or less. In the case of considering a form having a polymer in addition to the thermoplastic elastomer and a form having a material other than flaky graphite as a conductive material, the content of the entire conductive material is desirably 10 parts by mass or more and 100 parts by mass or less with respect to 100 parts by mass of the polymer component.

[Other Components]

The electrically conductive composition of the present disclosure may contain, in addition to a polymer component such as a thermoplastic elastomer and a conductive material such as flaky graphite, a processing aid, a plasticizer, a reinforcing material, an anti-aging agent, a colorant, or the like. Examples of the processing aid include an aliphatic compound and a silicone compound known as a lubricant.

[Physical Properties]

In the electrically conductive composition of the present disclosure, physical properties such as volume resistivity, type A durometer hardness and elongation may be determined considering a balance between flexibility and conductivity. For example, the volume resistivity is preferably 10 Ω·cm or less, 2.0 Ω·cm or less, and more preferably 1.0 Ω·cm or less. The type A durometer hardness is preferably 92 or less, more preferably 90 or less. As the elongation, an elongation at break is preferably 10% or more, 30% or more, and more preferably 50% or more. The elongation at break may be measured in accordance with JIS K6251:2017.

<Sheet-Form Flexible Electrode>

A sheet-form flexible electrode of the present disclosure is produced using the electrically conductive composition of the present disclosure. A thickness of the sheet-form flexible electrode of the present disclosure may be appropriately determined depending on the application. Examples of suitable applications include a piezoelectric sensor and a capacitance sensor. If the sheet-form flexible electrode of the present disclosure is used as an electrode of a sensor, the thickness may be 50 μm or more and 500 μm or less. The sheet-form flexible electrode of the present disclosure may have a uniform planar shape or a mesh shape having an opening.

From the viewpoint of having suitable conductivity as an electrode, it is desirable that the sheet-form flexible electrode of the present disclosure have a volume resistivity of 10 Ω·cm or less. The volume resistivity is preferably 2.0 Ω·cm or less, more preferably 1.0 Ω·cm or less. From the viewpoint of flexibility, the sheet-form flexible electrode of the present disclosure has a type A durometer hardness of preferably 92 or less, more preferably 90 or less. Further, from the viewpoint of extensibility, the sheet-form flexible electrode of the present disclosure has an elongation at break of preferably 10% or more, 30% or more, and more preferably 50% or more.

<Method for Producing Sheet-Form Flexible Electrode>

A method for producing a sheet-form flexible electrode of the present disclosure is one of methods for producing a sheet-form flexible electrode using the electrically conductive composition of the present disclosure, and includes a kneading step and a molding step.

(1) Kneading Step

The present step is a step in which a raw material composition containing a thermoplastic elastomer and expanded graphite is kneaded to produce an electrically conductive composition, the thermoplastic elastomer having a melt viscosity of 50 Pa·s or more and 1400 Pa·s or less at 200° C. in a low shear zone with a shear rate of 60 s$^{-1}$ or more and 200 s$^{-1}$ or less.

In the present step, the raw material composition obtained by adding a conductive material containing expanded graphite and, if necessary, an additive such as a processing aid, to a polymer component containing a predetermined thermoplastic elastomer is kneaded to produce the electrically conductive composition. The kneading may be performed using a commonly used apparatus such as a Banbury mixer, a kneader, a twin-screw kneader or a twin-screw extruder. If the number of revolutions during kneading is too small, uniformity of the material cannot be ensured; if the number of revolutions is too large, expanded graphite is likely to undergo micronization. Thus, during kneading, the number of revolutions, the shape of screws and the like may be appropriately adjusted. A temperature during kneading may be, for example, about 180° C. to 220° C., considering a softening point of the thermoplastic elastomer.

The polymer component including the thermoplastic elastomer and other permissible components are as described for constituent materials of the electrically conductive composition of the present disclosure. Since expanded graphite as a raw material in an angular shape is more likely to be peeled off than expanded graphite in a spherical shape, from the viewpoint that flaky graphite is likely to be produced by kneading, expanded graphite having a roundness of 0.5 or less may be used. In the case where a volume-based particle size distribution of expanded graphite is measured, it is desirable that a peak top of a first peak in a particle size distribution curve be present at a particle size of 10 μm or more. The peak top is more preferably present at a particle size of 50 μm or more. By specifying the shape and size of the expanded graphite to be used in this way, a shear force applied during kneading is able to effectively act to promote cleavage, and the thermoplastic elastomer is likely to enter between layers. As a result, flaking can be promoted rather than micronization by breaking the expanded graphite. By dispersing the produced flaky graphite in a base material having a thermoplastic elastomer, a sheet-form flexible electrode having high conductivity can be realized.

From the viewpoint that flaky graphite is likely to be produced by kneading, it is desirable that a crystallite thickness (thickness in c-axis direction: Lc (002)) of the expanded graphite as a raw material be relatively small. It is desirable that the crystallite thickness be, for example, 220 Å (22 nm) or more and 320 Å (32 nm) or less. It is desirable that a volume average particle size of the expanded graphite be 50 μm or more and 3000 μm or less, more preferably 2000 μm or less and 1000 μm or less.

From the viewpoint of achieving both flexibility and conductivity of the sheet-form flexible electrode, the amount of expanded graphite to be blended in is desirably 10 parts by mass or more and 100 parts by mass or less with respect to 100 parts by mass of the thermoplastic elastomer. Considering conductivity, the amount is more preferably 30 parts by mass or more and 50 parts by mass or more. Considering flexibility and moldability, the amount is more preferably 90 parts by mass or less and 80 parts by mass or less. In the case of considering a form having a polymer in addition to the thermoplastic elastomer and a form having a material other than flaky graphite as a conductive material, the content of the entire conductive material is desirably 10 parts by mass or more and 100 parts by mass or less with respect to 100 parts by mass of the polymer component.

(2) Molding Step

The present step is a step in which the electrically conductive composition produced in the preceding step is injection molded or extrusion molded into the form of a sheet. As an injection molding machine and an extrusion molding machine, a commonly used apparatus may be used. A temperature during molding may be, for example, about 180° C. to 220° C., considering a softening point of the thermoplastic elastomer.

After the present step, a rolling step, a pressing step or the like may further be performed. By continuously performing the rolling step, the pressing step or the like after the present step, productivity is further improved. When a molded product in the form of a sheet obtained in the present step is subjected to rolling or pressing, the thickness can further be reduced and made uniform. By reducing the thickness of the electrode, flexibility is further improved. In the case where the electrode is used in a biological information sensor or the like, a subject hardly feels discomfort. In the case of producing a mesh-shaped electrode, rotary extrusion molding or the like may be adopted in which an electrode is molded into a mesh shape while being extruded in the present step, or alternatively, an electrode may be molded into the form of a sheet in the present step and then subjected to perforating processing.

<Capacitance Sensor>

A capacitance sensor of the present disclosure includes the sheet-form flexible electrode of the present disclosure. The capacitance sensor of the present disclosure may be configured to include, for example, an insulating layer containing an elastomer or the like, and the sheet-form flexible electrode of the present disclosure laminated on the insulating layer. Considering flexibility and integration with an electrode, it is desirable that the insulating layer contain a thermoplastic elastomer. The capacitance sensor may be a sensor in which two electrodes are arranged with the insulating layer therebetween and a capacitance between the electrodes is detected, or may be a sensor in which one electrode is a detection electrode and the other electrode is a shield electrode shielding noise from the detection electrode, and a capacitance generated between the detection electrode and an object to be detected is detected.

Since the capacitance sensor of the present disclosure is made of a flexible material, the capacitance sensor may be arranged in a planar shape or may be arranged to be wound around a member. For example, the capacitance sensor is suitable for a sensor that is arranged in an interior part of a vehicle, such as a steering wheel, a door trim, an armrest, a console box, an instrument panel, a headrest, or a seat, and detects approaching or contact of a human. The capacitance sensor is also suitable for a sensor used in a driver monitoring system. For example, the capacitance sensor of the present disclosure may be laid on a vehicle seat and detect a pressure distribution or a pressure change of a seated occupant. Based on the detected pressure change, a movement of a center of gravity or a change in posture may be estimated, and a respiratory rate or heart rate can be measured.

Examples

Next, the present disclosure will be described more specifically with reference to examples.
<Production of Electrically Conductive Sheet>
First, predetermined raw materials were blended in the amounts shown in Table 1 and Table 2 below, and kneaded for 5 minutes at a temperature of 200° C. and a rotation speed of 100 rpm using a Laboplastomill (registered trademark), followed by extrusion to produce an electrically conductive sheet having a width of 150 mm and a thickness of 500 μm. Electrically conductive sheets of Examples 1 to 13 shown in Table 1 are included in the concept of the electrically conductive composition and the sheet-form flexible electrode of the present disclosure. Details of the raw materials used are as follows.
[Thermoplastic Elastomer]
Styrene-based elastomer [1]: "Kraton (registered trademark) MD1648" made by Kraton Polymer Japan, with a styrene content of 20% by mass.
Styrene-based elastomer [2]: "Kraton (registered trademark) MD6951" made by Kraton Polymer Japan, with a styrene content of 34% by mass.
Styrene-based elastomer [3]: "Tuftec (registered trademark) H1221" made by Asahi Kasei Corporation, with a styrene content of 30% by mass.
Olefin-based elastomer: ethylene-octene copolymer: "Engage (registered trademark) 8137" made by Dow Chemical Company.
[Conductive Material]
Expanded graphite [1]: "AED-200" made by Fuji Graphite Industry.
Expanded graphite [2]: "AED-03" made by Fuji Graphite Industry.
Expanded graphite [3]: "AED-50" made by Fuji Graphite Industry.
Expanded graphite [4]: "EXP-P" made by Nippon Graphite Industries.

Expanded graphite [5]: "LEP" made by Nippon Graphite Industries.
Expanded graphite [6]: "FS-5" made by Fuji Graphite Industry.
Vein graphite: "FB-100" made by Nippon Graphite Industries.
Electrically conductive carbon black: "Ketjenblack (registered trademark) EC600JD" made by Lion Specialty Chemicals.
[Processing Aid (Lubricant)]
Stearic acid amide: "Armoslip (registered trademark) HT" made by Lion Specialty Chemicals.
Silicone-based lubricant: "TEGOMER (registered trademark) P 121" made by EVONIK.
<Melt Viscosity Measurement of Thermoplastic Elastomer>
A melt viscosity of a thermoplastic elastomer as a raw material was measured using "Capilograph (registered trademark) 1D PMD-C" made by Toyo Seiki Seisaku-sho, Ltd. (in accordance with JIS K7199:1999). The measurement in a low shear zone was performed under conditions of a temperature of 200° C. and a shear rate of 61 s$^{-1}$. The measurement in a high shear zone was performed under conditions of a temperature of 200° C. and a shear rate of 1216 s$^{-1}$. Then, the melt viscosity in the low shear zone was divided by the melt viscosity in the high shear zone to calculate a melt viscosity ratio (melt viscosity ratio=melt viscosity in low shear zone/melt viscosity in high shear zone).
<Measurement of Type A Durometer Hardness of Thermoplastic Elastomer>
Type A durometer hardness of a thermoplastic elastomer as a raw material was measured using a hardness meter ("ASKER P1-A type" made by Kobunshi Keiki) in accordance with JIS K6253-3:2012. The measurement was performed in which three test pieces each having a thickness of 1 mm were stacked, and a value measured after a lapse of 15 seconds immediately after contact between a pressing needle and the test pieces was adopted.
<Measurement of Roundness, Crystallite Thickness and Particle Size Distribution of Conductive Material of Raw Material>
(1) Roundness
Roundness of a conductive material as a raw material was measured using a particle size/particle image analyzer ("Microtrac SIA" made by Microtrac Bell). The roundness is an average value of any number (1000 or more) of particles. Here, graphite other than electrically conductive carbon black was an object to be measured as a "conductive material as a raw material". The object to be measured was the same in the following measurements of (2) crystallite thickness and (3) particle size distribution.
(2) Crystallite Thickness: Lc (002)
A crystallite thickness of a conductive material as a raw material was measured using a multipurpose X-ray diffractometer "Empyrean (registered trademark)" made by PANalytical. A CuKα ray was used as an X-ray, and a measured diffraction angle (2θ) was 20° to 53°. A sample was left uncompressed. Peak area of a crystal plane (002) was obtained by waveform separation of an X-ray diffraction pattern based on a pseudo-Voigt function (baseline correction range: about 41° to 48°).
(3) Particle Size Distribution
A volume-based particle size distribution of a conductive material as a raw material was measured using a particle size distribution measurement device ("Microtrac MT3000II series" made by Microtrac Bell), and a volume average particle size and a peak top (modal diameter; modal particle diameter) of a peak indicating a maximum frequency were obtained.

<Moldability of Electrically Conductive Composition>

Moldability of an electrically conductive composition was evaluated based on whether a good sheet was able to be continuously molded during production of an electrically conductive sheet. If a good sheet was able to be molded, the moldability was evaluated to be good (indicated by ○ in the table below); if a good sheet was unable to be molded, the moldability was evaluated to be poor (indicated by x in the same table). The expression "if a good sheet was able to be continuously molded" means a case where a sheet on a practical level was able to be molded with a length of 1 m or more in an extrusion direction. The expression "if a good sheet was unable to be molded" means a case where a sheet did not come out from a discharge port of the Laboplasto-mill, or a sheet was torn from an edge, or a sheet had holes, or a surface of a sheet had streaks or patterns.

<Properties of Electrically Conductive Sheet>

Conductivity, flexibility and elongation of a produced electrically conductive sheet were evaluated. Measurement methods were as follows.

[Conductivity]

A volume resistivity of an electrically conductive sheet (having a width of 150 mm and a thickness of 500 μm) was measured using a low resistivity meter "Loresta (registered trademark) GP" (voltage: 5 V, in accordance with JIS K7194:1994) made by Mitsubishi Chemical Analytech.

[Flexibility]

Flexibility of an electrically conductive sheet was evaluated by a type A durometer hardness value. A test piece made of the same material as each electrically conductive sheet was produced in the form of a sheet with a thickness of 1 mm, three test pieces were stacked for use, and the type A durometer hardness thereof was measured using the aforesaid hardness tester. At this time, a value measured after a lapse of 15 seconds immediately after contact between a pressing needle and the test pieces was adopted as the type A durometer hardness.

[Elongation]

An electrically conductive sheet was subjected to a tensile test specified in JIS K6251:2017 to measure an elongation at break ($E_b$). The tensile test was performed using a No. 5 dumbbell-shaped test piece at a tensile rate of 100 mm/min at room temperature.

<Measurement of Roundness and Particle Size Distribution of Conductive Material in Electrically Conductive Sheet>

By burning an electrically conductive sheet in an electric furnace and measuring the resulting ash using the aforesaid particle size/particle image analyzer, the roundness of a conductive material other than electrically conductive carbon black contained in the electrically conductive sheet was obtained. The roundness is an average value of any number (1000 or more) of particles. A particle size distribution of the ash was measured by the aforesaid particle size distribution measurement device, and a volume average particle size, a peak top (modal diameter; modal particle diameter) of a peak indicating a maximum frequency, and a start point of a shoulder portion of the conductive material other than electrically conductive carbon black contained in the electrically conductive sheet were obtained. The burning of the electrically conductive sheet was performed at 400° C. for 2 hours in a nitrogen atmosphere.

Figure 3:
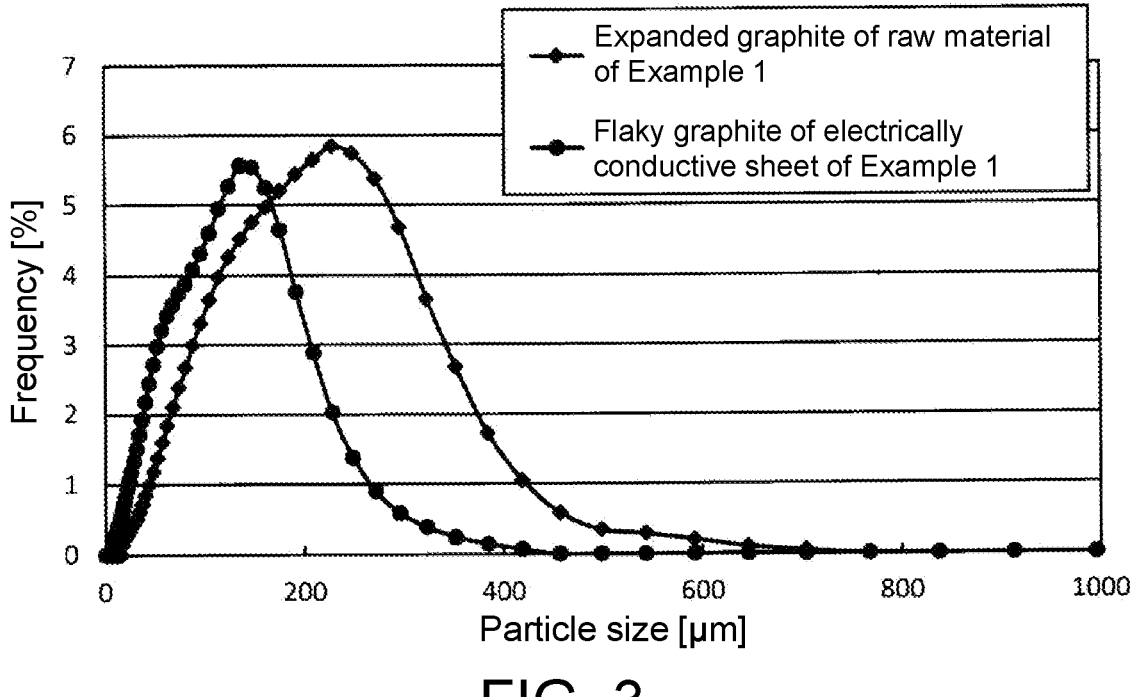
FIG. 3 is a graph showing a particle size distribution of expanded graphite as a raw material and a particle size distribution of flaky graphite contained in a produced electrically conductive sheet of Example 1.
Figure 4:
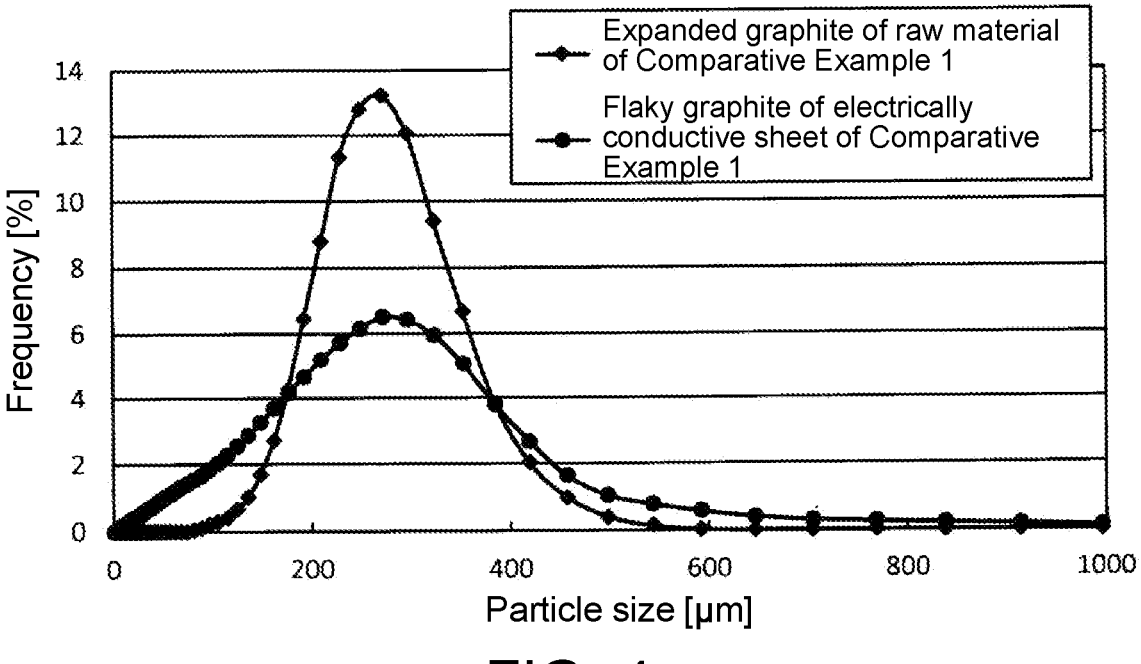
FIG. 4 is a graph showing a particle size distribution of expanded graphite as a raw material and a particle size distribution of flaky graphite contained in a produced electrically conductive sheet of Comparative Example 1.

Table 1 and Table 2 collectively show the raw materials and measurement results of properties of the produced electrically conductive sheets. As an example of a particle size distribution of flaky graphite contained in the electrically conductive sheet, FIG. 3 shows a particle size distribution of expanded graphite as a raw material and a particle size distribution of flaky graphite contained in the produced electrically conductive sheet of Example 1. For comparison, FIG. 4 shows a particle size distribution of expanded graphite as a raw material and a particle size distribution of flaky graphite contained in the produced electrically conductive sheet of Comparative Example 1.

TABLE 1

| | | | Example 1 | Example 2 | Example 3 | Example 4 | Example 5 | Example 6 | Example 7 | Example 8 |
|---|---|---|---|---|---|---|---|---|---|---|
| Raw material (unit: parts by mass) | Thermoplastic elastomer | Styrene-based elastomer [1] | 100 | 100 | 100 | 100 | 100 | — | — | 100 |
| | | Styrene-based elastomer [2] | — | — | — | — | — | 100 | — | — |
| | | Styrene-based elastomer [3] | — | — | — | — | — | — | — | — |
| | | Olefin-based elastomer | — | — | — | — | — | — | 100 | — |
| | Conductive material | Expanded graphite [1] | 60 | — | — | 55 | 60 | 60 | 60 | 90 |
| | | Expanded graphite [2] | — | 60 | — | — | — | — | — | — |
| | | Expanded graphite [3] | — | — | 60 | — | — | — | — | — |
| | | Expanded graphite [4] | — | — | — | — | — | — | — | — |
| | | Expanded graphite [5] | — | — | — | — | — | — | — | — |
| | | Expanded graphite [6] | — | — | — | — | — | — | — | — |
| | | Vein graphite | — | — | — | — | — | — | — | — |
| | | Carbon black | — | — | — | — | — | — | — | — |
| | Processing aid | Stearic acid amide | 10 | 10 | 10 | — | — | 10 | 10 | 10 |
| | | Silicone-based lubricant | — | — | — | — | 10 | — | — | — |

TABLE 1-continued

| | | | | | | | | | |
|---|---|---|---|---|---|---|---|---|---|
| Physical properties of thermoplastic elastomer | Melt viscosity in low shear zone [Pa·s] | 193 | 193 | 193 | 193 | 193 | 668 | 525 | 193 |
| | Melt viscosity ratio | 2.4 | 2.4 | 2.4 | 2.4 | 2.4 | 3.2 | 3.3 | 2.4 |
| | Type A durometer hardness | 52 | 52 | 52 | 52 | 52 | 45 | 60 | 52 |
| Graphite as raw material | Roundness | 0.46 | 0.44 | 0.47 | 0.46 | 0.46 | 0.46 | 0.46 | 0.46 |
| | Crystallite thickness Lc (002) [Å] | 271 | 269 | 269 | 271 | 271 | 271 | 271 | 271 |
| | Volume average particle size [μm] | 172 | 1000< | 50 | 172 | 172 | 172 | 172 | 172 |
| | Peak top of particle size distribution [μm] | 215 | 1000< | 62 | 215 | 215 | 215 | 215 | 215 |
| Moldability of electrically conductive composition | Whether continuous extrusion of sheet of 500 μm is possible | ○ | ○ | ○ | ○ | ○ | ○ | ○ | ○ |
| Properties of electrically conductive sheet | Volume resistivity [Ω·cm] | 0.5 | 0.5 | 1.0 | 0.7 | 0.5 | 0.9 | 1.0 | 0.2 |
| | Type A durometer hardness (flexibility) | 89 | 89 | 89 | 88 | 89 | 89 | 84 | 92 |
| | Elongation at break [%] | 80 | 50 | 60 | 50 | 150 | 30 | 50 | 60 |
| Conductive material in electrically conductive sheet (excluding carbon black) | Roundness | 0.45 | 0.46 | 0.46 | 0.46 | 0.45 | 0.46 | 0.45 | 0.45 |
| | Volume average particle size [μm] | 102 | 125 | 48 | 98 | 95 | 70 | 85 | 99 |
| | Peak top of particle size distribution [μm] | 153 | 168 | 58 | 135 | 120 | 76 | 94 | 138 |
| | Start point of shoulder portion of particle size distribution [μm] | 52 | 54 | Difficult to measure | 49 | 50 | 34 | 43 | 53 |

| | | | Example 9 | Example 10 | Example 11 | Example 12 | Example 13 |
|---|---|---|---|---|---|---|---|
| Raw material (unit: parts by mass) | Thermoplastic elastomer | Styrene-based elastomer [1] | — | — | — | — | — |
| | | Styrene-based elastomer [2] | — | — | — | — | — |
| | | Styrene-based elastomer [3] | 75 | 75 | 75 | 75 | 75 |
| | | Olefin-based elastomer | 25 | 25 | 25 | 25 | 25 |
| | Conductive material | Expanded graphite [1] | 10 | 20 | 30 | 20 | 30 |
| | | Expanded graphite [2] | — | — | — | — | — |
| | | Expanded graphite [3] | — | — | — | — | — |
| | | Expanded graphite [4] | — | — | — | — | — |
| | | Expanded graphite [5] | — | — | — | — | — |
| | | Expanded graphite [6] | — | — | — | — | — |
| | | Vein graphite | — | — | — | — | — |
| | | Carbon black | 20 | 20 | 20 | 15 | 15 |

TABLE 1-continued

| | | | | | | | |
|---|---|---|---|---|---|---|---|
| Pro-cessing aid | Stearic acid amide | 10 | 10 | 10 | 10 | 10 |
| | Silicone-based lubricant | — | — | — | — | — |
| Physical properties of thermo-plastic elastomer | Melt viscosity in low shear zone [Pa · s] | 1120 | 1120 | 1120 | 1120 | 1120 |
| | Melt viscosity ratio | 3.8 | 3.8 | 3.8 | 3.8 | 3.8 |
| | Type A durometer hardness | 51 | 51 | 51 | 51 | 51 |
| Graphite as raw material | Roundness | 0.46 | 0.46 | 0.46 | 0.46 | 0.46 |
| | Crystallite thickness Lc (002) [Å] | 271 | 271 | 271 | 271 | 271 |
| | Volume average particle size [μm] | 172 | 172 | 172 | 172 | 172 |
| | Peak top of particle size distribution [μm] | 215 | 215 | 215 | 215 | 215 |
| Moldability of electrically conductive composition | Whether continuous extrusion of sheet of 500 μm is possible | ○ | ○ | ○ | ○ | ○ |
| Properties of electrically conductive sheet | Volume resistivity [Ω · cm] | 0.6 | 0.4 | 0.2 | 0.9 | 0.5 |
| | Type A durometer hardness (flexibility) | 89 | 89 | 92 | 87 | 90 |
| | Elongation at break [%] | 890 | 320 | 200 | 630 | 300 |
| Conductive material in electrically conductive sheet (excluding carbon black) | Roundness | 0.45 | 0.45 | 0.45 | 0.45 | 0.45 |
| | Volume average particle size [μm] | 92 | 90 | 86 | 95 | 96 |
| | Peak top of particle size distribution [μm] | 148 | 132 | 120 | 153 | 150 |
| | Start point of shoulder portion of particle size distribution [μm] | 50 | 51 | 50 | 49 | 53 |

TABLE 2

| | | | Compara-tive Example 1 | Compara-tive Example 2 | Compara-tive Example 3 | Compara-tive Example 4 | Compara-tive Example 5 | Compara-tive Example 6 | Compara-tive Example 7 | Refer-ence Example 1 |
|---|---|---|---|---|---|---|---|---|---|---|
| Raw material (unit: parts by mass) | Thermo-plastic elastomer | Styrene-based elastomer [1] | 100 | 100 | 100 | 100 | 100 | 100 | — | 100 |
| | | Styrene-based elastomer [2] | — | — | — | — | — | — | — | — |
| | | Styrene-based elastomer [3] | — | — | — | — | — | — | 100 | — |
| | | Olefin-based elastomer | — | — | — | — | — | — | — | — |
| | Conduct-ive material | Expanded graphite [1] | — | — | — | — | — | — | 60 | 120 |
| | | Expanded graphite [2] | — | — | — | — | — | — | — | — |
| | | Expanded graphite [3] | — | — | — | — | 10*1 | — | — | — |
| | | Expanded graphite [4] | 60 | — | — | — | — | — | — | — |
| | | Expanded graphite [5] | — | 60 | — | — | 50*2 | — | — | — |
| | | Expanded graphite [6] | — | — | 60 | — | — | — | — | — |

TABLE 2-continued

| | | Comparative Example 1 | Comparative Example 2 | Comparative Example 3 | Comparative Example 4 | Comparative Example 5 | Comparative Example 6 | Comparative Example 7 | Reference Example 1 |
|---|---|---|---|---|---|---|---|---|---|
| | Vein graphite | — | — | — | 60 | — | — | — | — |
| | Carbon black | — | — | — | — | — | 17 | — | — |
| Processing aid | Stearic acid amide | 10 | 10 | 10 | 10 | 10 | 10 | 10 | 10 |
| | Silicone-based lubricant | — | — | — | — | — | — | — | — |
| Physical properties of thermoplastic elastomer | Melt viscosity in low shear zone [Pa · s] | 193 | 193 | 193 | 193 | 193 | 193 | 2026 | 193 |
| | Melt viscosity ratio | 2.4 | 2.4 | 2.4 | 2.4 | 2.4 | 2.4 | 7.1 | 2.4 |
| | Type A durometer hardness | 52 | 52 | 52 | 52 | 52 | 52 | 42 | 52 |
| Graphite as raw material | Roundness | 0.60 | 0.55 | Unmeasurable | 0.59 | 0.47*1  0.55*2 | — | 0.46 | 0.46 |
| | Crystallite thickness Lc (002) [Å] | 332 | 321 | 270 | 419 | 269*1  315*2 | — | 271 | 271 |
| | Volume average particle size [μm] | 230 | 135 | 7 | 80 | 50*1  135*2 | — | 172 | 172 |
| | Peak top of particle size distribution um] | 271 | 148 | 8 | 90 | 62*1  148*2 | — | 215 | 215 |
| Moldability of electrically conductive composition | Whether continuous extrusion of sheet of 500 μm is possible | ○ | ○ | ○ | ○ | ○ | ○ | x | x |
| Properties of electrically conductive sheet | Volume resistivity [Ω • cm] | 50 | 24 | 4.2 | 283 | 5.8 | 2.1 | 1.8 | <0.1 |
| | Type A durometer hardness (flexibility) | 83 | 82 | 87 | 82 | 82 | 83 | 89 | 95 |
| | Elongation at break [%] | 50 | 60 | 65 | 50 | 80 | >1000 | 340 | 10 |
| Conductive material in electrically conductive sheet (excluding carbon black) | Roundness | 0.54 | 0.54 | Unmeasurable | 0.58 | (0.54) | — | 0.49 | 0.48 |
| | Volume average particle size [μm] | 223 | 128 | 6 | 71 | — | — | 73 | 92 |
| | Peak top of particle size distribution μm] | 270 | 145 | 8 | 83 | 145 | — | 85 | 103 |
| | Start point of shoulder portion of particle size distribution [μm] | None | None | Unmeasurable | None | 56 | — | None | 51 |

As shown in Table 1, the electrically conductive sheets of Examples 1 to 8 were produced using a thermoplastic elastomer satisfying the above two conditions (a) and (b) regarding melt viscosity and expanded graphite having a roundness of 0.5 or less, and contained flaky graphite having a roundness of 0.5 or less. Hence, the electrically conductive sheets were flexible, had an elongation at break of 30% or more, had a volume resistivity of 1.0 Ω·cm or less, had high conductivity, and were able to be continuously molded into the form of a sheet by extrusion molding. As shown in the particle size distribution of the flaky graphite in the electrically conductive sheet of Example 1 in FIG. 3 as an example, a particle size distribution curve of the flaky graphite in the electrically conductive sheets of Examples 1 to 8 had a main peak with a peak top present in the range of 50 μm to 300 μm. The electrically conductive sheets other than Example 3 had a shoulder portion whose start point was present in the range of 10 μm to 100 μm. In the electrically conductive sheet of Example 3, it was difficult to clearly identify a shoulder portion in the particle size distribution curve. Reasons for this may include that peaks of expanded graphite as a raw material and flaky graphite overlapped because the expanded graphite had a relatively small particle size, and that the particle size distribution measurement device performed two-dimensional observation and was thus unable to clearly distinguish between the graphite that had undergone flaking and the graphite that had not undergone flaking.

The electrically conductive sheets of Examples 9 to 13 were produced using two kinds of thermoplastic elastomers.

As shown in Comparative Example 7 in Table 2, the styrene-based elastomer [3] had high melt viscosity. However, by addition of an olefin-based elastomer having low melt viscosity (see Example 7) thereto, the thermoplastic elastomer after mixing satisfied the conditions (a) and (b) regarding melt viscosity. In this way, the electrically conductive sheets of Examples 9 to 13 were produced using a thermoplastic elastomer satisfying the above two conditions (a) and (b) regarding melt viscosity and expanded graphite having a roundness of 0.5 or less, and contained flaky graphite having a roundness of 0.5 or less. Hence, the electrically conductive sheets were flexible, had a volume resistivity of 1.0 Ω·cm or less, had high conductivity, and were able to be continuously molded into the form of a sheet by extrusion molding. A particle size distribution curve of the flaky graphite in the electrically conductive sheets of Examples 9 to 13 had a main peak with a peak top present in the range of 50 μm to 300 μm, and a shoulder portion with a start point present in the range of 10 μm to 100 μm. Furthermore, the electrically conductive sheets of Examples 9 to 13 were produced by blending in electrically conductive carbon black in addition to expanded graphite as a conductive material. Hence, compared to the electrically conductive sheets of Examples 1 to 8, the content of flaky graphite was reduced and the elongation at break was increased.

In contrast, as shown in Table 2, the electrically conductive sheets of Comparative Examples 1 and 2 were produced using expanded graphite having a roundness of greater than 0.5, and contained flaky graphite having a roundness of greater than 0.5. Hence, the volume resistivity increased, and desired conductivity was unable to be realized. As shown in the particle size distribution of flaky graphite in the electrically conductive sheet of Comparative Example 1 in FIG. 4 as an example, a particle size distribution curve of the flaky graphite in the electrically conductive sheets of Comparative Examples 1 to 2 had one peak, but did not have a shoulder portion.

Since the electrically conductive sheet of Comparative Example 3 was produced using expanded graphite having a small particle size (peak top of first peak: 8 μm), the roundness of flaky graphite was unable to be measured, and the presence or absence of a shoulder portion was unable to be measured. According to the electrically conductive sheet of Comparative Example 3, the volume resistivity was less than that of the electrically conductive sheets of Comparative Examples 1 and 2. However, it cannot be said that sufficient conductivity was provided for an electrode for a sensor.

The electrically conductive sheet of Comparative Example 4 was produced using vein graphite having a roundness of greater than 0.5, and contained flaky graphite having a roundness of greater than 0.5. While a particle size distribution curve of the flaky graphite in the electrically conductive sheet of Comparative Example 4 had one peak, it did not have a shoulder portion. As a result, the volume resistivity of the electrically conductive sheet of Comparative Example 4 was greatly increased.

The electrically conductive sheet of Comparative Example 5 was produced using a mixture of expanded graphite (shown affixed with *1 in Table 2) having a roundness of 0.5 or less and expanded graphite (shown affixed with *2 in Table 2) having a roundness of greater than 0.5. As a result, the volume resistivity was less than that of the electrically conductive sheet of Comparative Example 2. However, it cannot be said that sufficient conductivity was provided for an electrode for a sensor. A particle size distribution curve of the flaky graphite in the electrically conductive sheet of Comparative Example 5 had a shoulder portion with a start point at 56 μm. The electrically conductive sheet of Comparative Example 5 used, as a raw material, a mixture of two kinds of expanded graphite having different volume average particle sizes and different peak tops of particle size distribution. Thus, when the flaky graphite at the shoulder portion was separated and the roundness was measured, the roundness was 0.54. From this measurement result, it is confirmed that in the electrically conductive sheet of Comparative Example 5, the expanded graphite as a raw material had not undergone flaking to be formed into a desired shape. The electrically conductive sheet of Comparative Example 6 was produced using carbon black. Hence, the electrically conductive sheet of Comparative Example 6 did not contain flaky graphite.

The electrically conductive sheet of Comparative Example 7 was produced using a thermoplastic elastomer satisfying none of the conditions (a) and (b) regarding melt viscosity. Hence, the electrically conductive sheet was unable to be continuously molded into the form of a sheet by extrusion molding. A particle size distribution curve of the flaky graphite in the electrically conductive sheet of Comparative Example 7 had one peak, but did not have a shoulder portion. A reason for this may be that the thermoplastic elastomer hardly entered between layers of expanded graphite, and flaking was hard to proceed. With respect to the electrically conductive sheet of Reference Example 1, since a large amount of expanded graphite as a raw material was blended in, a sheet having a thickness of 500 μm was unable to be continuously molded by extrusion molding, and moldability deteriorated as a result.

The invention claimed is:

1. An electrically conductive composition, comprising a thermoplastic elastomer and flaky graphite, wherein the thermoplastic elastomer is selected from the group consisting of styrene-butadiene-styrene block copolymer (SBS), styrene-ethylene-butylene-styrene block copolymer (SEBS), styrene-ethylene-propylene-styrene block copolymer (SEPS) and styrene-ethylene-ethylene-propylene-styrene block copolymer (SEEPS), wherein a styrene content in the thermoplastic elastomer is 35% by mass or less, a melt viscosity of the thermoplastic elastomer at 200° C. in a low shear zone with a shear rate of 60 s$^{-1}$ or more and 200 s$^{-1}$ or less is 50 Pa·s or more and 1400 Pa·s or less, and the flaky graphite has a roundness of 0.5 or less, and a volume-based particle size distribution curve of the flaky graphite has one or more peaks, and a shoulder portion continuous on a small particle size side of a main peak defined by selecting one of the peaks as the main peak, and in the volume-based particle size distribution curve, a peak top of the main peak is present at a particle size of 50 μm or more to 300 μm, and at least one of a start point and an end point of the shoulder portion is present at a particle size of 10 μm or more to 100 μm, wherein the electrically conductive composition is a solvent-free electrically conductive composition that is formed by kneading a raw material composition comprising the thermoplastic elastomer and expanded graphite, and the expanded graphite has a roundness of 0.5 or less before kneading, and wherein the flaky graphite is produced from the expanded graphite after kneading.

2. The electrically conductive composition according to claim 1, wherein a content of the flaky graphite is 10 parts by mass or more and 100 parts by mass or less with respect to 100 parts by mass of the thermoplastic elastomer.

3. The electrically conductive composition according to claim 1, further comprising an electrically conductive filler having a particle size of 1 μm or less.

4. The electrically conductive composition according to claim 3, wherein a content of the electrically conductive filler is 5 parts by mass or more and 20 parts by mass or less with respect to 100 parts by mass of the thermoplastic elastomer.

5. The electrically conductive composition according to claim 1, further comprising one or more processing aids selected from an aliphatic compound and a silicone compound.

6. A sheet-form flexible electrode, using the electrically conductive composition according to claim 1.

7. The sheet-form flexible electrode according to claim 6, having a volume resistivity of 10 Ω·cm or less.

8. A capacitance sensor, comprising the sheet-form flexible electrode according to claim 6.

9. A method for producing a sheet-form flexible electrode, producing the sheet-form flexible electrode according to claim 6, comprising:

a kneading step in which the raw material composition comprising the thermoplastic elastomer and the expanded graphite is kneaded to produce the electrically conductive composition; and a molding step in which the electrically conductive com-
position is injection molded or extrusion molded into a
form of a sheet.

10. The method for producing a sheet-form flexible elec-
trode according to claim 9, wherein, in the volume-based particle size distribution curve of the
expanded graphite before kneading, a peak top of a first
peak is present at a particle size of 10 μm or more.

\* \* \* \* \*